United States Patent [19]

Tour et al.

[11] Patent Number: 5,338,823
[45] Date of Patent: Aug. 16, 1994

[54] LITHIUM/HMPA-PROMOTED SYNTHESIS OF POLY(PHENYLENES)

[76] Inventors: James M. Tour, 3700 Linbrook Dr., Columbia, S.C. 29204; Eric B. Stephens, 1600 Longcreek Dr. Apt. 2002, Columbia, S.C. 29210

[21] Appl. No.: 987,353

[22] Filed: Dec. 7, 1992

Related U.S. Application Data

[62] Division of Ser. No. 543,673, Jun. 25, 1990, Pat. No. 5,169,929.

[51] Int. Cl.$^5$ ............................................. C08G 61/00
[52] U.S. Cl. ..................................................... 528/397
[58] Field of Search ........................................ 528/397

[56] References Cited

U.S. PATENT DOCUMENTS 4,576,688   3/1986   David ............................... 528/397

OTHER PUBLICATIONS

Elsenbaumer, et al. Handbook of Conducting Polymers (1986), T. A. Skotheime ed. pp. 213–263.
Perlstein, Angew. Chem. Int. Ed. Engl. (1977) 16. pp. 519–534.
Kovacic, et al. J. Polymer Science (1966) Part A-1 4. pp. 5–28.
Kovacic, et al., J. Polymer Science (1966) Part A-1 pp. 1445–1462.
Encyclopedia of Polymer Science & Technology (1969), vol. 11 pp. 318–363.
Encyclopedia of Polymer Science & Technology (1969), vol. 11 pp. 380–389.
Edwards, et al. J. Polymer Science (1955) XVI. pp. 589–598.
Goldfinger J. Polymer Science (1949) IV pp. 93–96.
Noren, et al. Macromolecular Reviews (1971) 5. pp. 386–431.
Yamamoto, et al. Bulletin Che. Soc. of Japan (1978) 51. (7) pp. 2091–2097.
Shacklette, et al. J. Chem. Soc., Chem. Commun. (1982) pp. 361–362.
Ivory, et al. J. Chem. Phys. (1979) 71. (3) pp. 1506–1507.
Shacklette, et al. J. Chem. Phys. (1980) 73. (8) pp. 4098–4102.
Kovacic, et al. J. Org. Chem. (1963) 28. pp. 968–972.
Kovacic, et al. J. Org. Chem. (1963) 28. pp. 1864–1867.
Kovacic, et al. J. Org. Chem. (1964) 29. pp. 100–104.
Kovacic, et al. J. Org. Chem. (1964) 29. pp. 2416–2420.
Kovacic, et al. J. Org. Chem. (1966) 31. pp. 2467–2470.
Kovacic, et al. Chem. Rev. (1987) 87, pp. 357–379.

*Primary Examiner*—John Kight, III
*Assistant Examiner*—T. Mosley
*Attorney, Agent, or Firm*—Brumbaugh, Graves, Donohue & Raymond

[57] ABSTRACT

Poly(phenylene) that is substantially free of insoluble material is prepared by the polymerization of a lithioarylhalide compound in the presence of a polar aprotic compound such as hexamethylphosphoramide, N,N,N',N'-tetramethylethylenediamine or hexamethylphosphorous triamide. The preferred reaction involves the polymerization of 1-bromo-4-lithiobenzene in the presence of hexamethylphosphoramide. The 1-bromo-4-lithiobenzene may be synthesized by reacting 1,4-dibromobenzene with t-butyllithium. These same types of reactions can also be used to synthesis other benzenoid polymers.

8 Claims, No Drawings

LITHIUM/HMPA-PROMOTED SYNTHESIS OF POLY(PHENYLENES)

The invention of this application was supported by a grant from the Office of Naval Research, Grant No.: N00014-89-3062. The U.S. Government has a paid-up license in this invention and the right in limited circumstances to require the patent owner to license others on reasonable terms.

This application is a divisional of U.S. Ser. No. 07/543,673, filed Jun. 25, 1990, which issued as U.S. Pat. No. 5,169,929 on Dec. 8, 1992.

BACKGROUND OF THE INVENTION

This invention relates to unique compositions of soluble, conductive poly(phenylene) and to synthetic methods useful in the synthesis of these compositions.

Poly(phenylene)s, also known as polyphenyls, polybenzenes or oligobenzenes, are linear polymers formed from substituted or unsubstituted benzene subunits. Of particular interest among these compounds are parapoly(phenylene)s which have been found to have conductivities following oxidation or reduction by known chemical, electrochemical, electronic or photonic means, comparable to metallic materials, i.e. greater than 100 $\Omega^{-1}cm^{-1}$. This property, combined with other physical and mechanical properties give such materials tremendous potential for applications in the electronics and photonics industry. A few, of numerous applications are listed.

(1) New semiconductor materials could be obtained.

(2) Lightweight batteries could be obtained which are of great importance to the military for naval and aerospace applications, and all mobile electric vehicles which are becoming commercially feasible.

(3) For $\chi^{(3)}$ nonlinear optical materials which will make-up the components of future photonic (rather than electronic) instrumentation.

Known methods for the formation of poly(phenylenes) involve (1) oxidative-cationic polymerization, (2) dehydrogenation of poly(1,3-cyclohexadiene), (3) metal catalyzed coupling reactions and (4) Dieis-Alder polymerizations. In nearly all cases, however, the polymers are insoluble if they contain a majority of the para form which is required for highly conducting material. This insoluble material limits the utility of the product poly(phenylene) because it cannot be cast into films or otherwise processed, other than by pressing, to form electrical components. Thus, it would be highly desirable to be able to produce a poly(phenylene) which was both soluble, and hence processible, and high in conductivity. Prior to the present invention, however, no synthetic method could achieve both these goals.

For example, Goldfinger, J. Polymer Sci 4, 93 (1949) and Edward et al., J. Polymer Sci 16, 589 (1955) reported the production of soluble, high molecular weight poly(phenylene) by treatment of p-dichlorobenzene with liquid potassium-sodium alloy, $KNa_2$, at 110° C. in dioxane for 24–48 hours. This material was never analyzed by IR or NMR techniques, nor was it ever used in conductivity studies. Later reports indicated that the severe reaction conditions caused the formation of many reduced (aliphatic) rings. Because of these aliphatics, the material is not adequate for conductivity studies.

Because of the recognition that aliphatics interfered with the desirable conductivity, methods have been developed for the synthesis of aliphatic-free poly(phenylenes). These invariably provided insoluble materials, however, and thus had unacceptable processability.

Poly(phenylene) has been synthesized via the mono-Grignard reagent of dibromobenzene. Yamamoto, et al., Bull. Chem. Soc. Jpn. 51, 2091, (1978). Coupling to form the polymer was achieved by the addition of a nickel(II) catalyst (presumably via reduction of the nickel to nickel(O), oxidative addition, transmetallation, and reductive elimination to regenerate nickel(O) as the active catalytic species). Degrees of polymerization are estimated to be about 20 units. However, completely insoluble poly(phenylene) is obtained by this method, though most of it is para by IR analysis. The insolubility is probably due to extensive cross linking. An analogous method by Ullmann using copper metal has been described for the synthesis of substituted poly(phenylenes); however, temperatures of 220°–270° C. are necessary, and the substituted poly(phenylenes) produced have limited conductivity due to nonplanarity of the aryl rings. Claesson, et al., Makromol. Chem 7 46 (1951).

Finally, para-poly(phenylene) has been synthesized by (1) bacterial oxidation of benzene and derivatization to form 1,2-diacetoxy-3,5-cyclohexadiene, (2) radical polymerization, and (3) pyrolysis at 140°–240° C. to form parapoly(phenylene). The intermediate is soluble and films can be cast. Ballard, et al., J. Chem. Soc. Chem. Commun. 954. However, upon pyrolysis, intractable and insoluble material is formed.

The present invention solves the problem which was recognized by the art and produces a soluble poly(phenylene) having a high conductivity.

SUMMARY OF THE INVENTION

In accordance with the invention, high conductivity poly(phenylene) that is substantially free of insoluble material is prepared by the polymerization of a lithioarylhalide compound in the presence of a polar aprotic compound such as hexamethylphosphoramide, N,N,N',N'-tetramethylethylenediamine or hexamethylphosphorous triamide. The preferred reaction involves the polymerization of 1-bromo-4-lithiobenzene in the presence of hexamethylphosphoramide. The 1-bromo-4-lithiobenzene may be synthesized by reacting 1,4-dibromobenzene with t-butyllithium. These same types of reactions can also be used to synthesize other benzenoid polymers.

DETAILED DESCRIPTION OF THE INVENTION

Benzenoid polymers such as polyphenylene are synthesized in accordance with the invention by polymerization of a lithioarylhalide in the presence of a polar aprotic compound. As used herein, halo or halide refers to fluorine, chlorine, bromine or iodine.

Suitable polar aprotic solvents are those which are not decomposed by alkyllithium. Exemplary polar aprotic compounds include hexamethylphosphoramide, i.e., $[(CH_3)_2N]_3P(O)$, and related compounds such as N,N,N',N'-tetramethyethylenediamine (TMEDA) and hexamethylphosphorous triamide, $[(CH_3)_2N]_3P$. Other compounds will generally have a pKa of greater than 40 and no reactive functionalities.

Lithioarylhalides for use in the invention are conveniently generated in situ by reaction of an aryl dihalide with at least one equivalent, and preferably at least two equivalents of an alkyllithium that undergoes lithium/- halogen exchange, e.g., n-butyllithium, ethyllithium or t-butyllithium.

The method of the invention can be used to produce para-poly(phenylene) that is substantially free of materials that are insoluble in solvents such as tetrahydrofuran (THF). Substantially free as used herein means that the level of insoluble materials present is so low that cast films can be readily be prepared. In general this means that the poly(phenylene) contains less than about 5% insoluble material.

An exemplary reaction of a synthesis according to the invention is shown in Eq. 1.

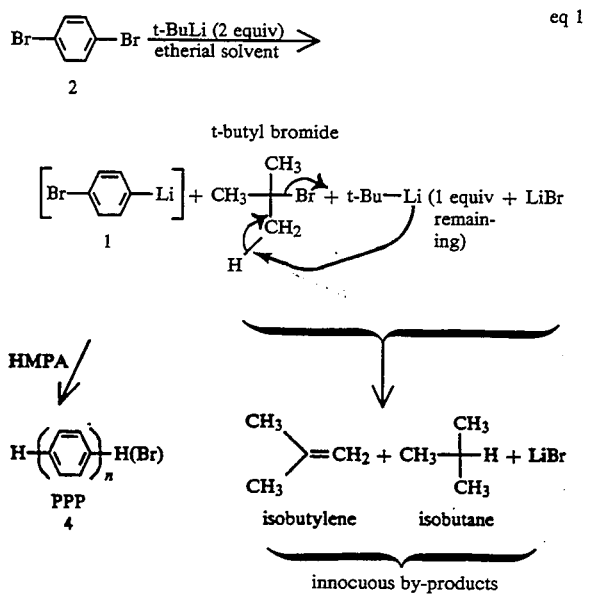

In this equation, 1-lithio-4-bromobenzene (1) is formed by treatment of 1,4-dibromobenzene (2) with t-butyllithium. Two equivalents of t-butyllithium are used per anion generation. The first equivalent is for lithium-halogen exchange to form 1-lithio-4-bromobenzene, t-butyl bromide, and lithium bromide. The second equivalent of the t-butyllithium is used for the elimination of the t-butyl bromide to afford another equivalent of lithium bromide, isobutylene, and isobutane. This conveniently makes all byproducts innocuous, i.e., there is no alkyl bromide remaining in solution. The lithium intermediate (1) is then treated in the same flask with hexamethylphosphoramide [(CH$_3$)$_2$N]$_3$P(O) which promotes the nearly instantaneous polymerization to poly(-phenylene).

The synthesis of the invention provides high molecular weight poly(phenylene) (M$_w$= ~1500-2700 with polydispersities ~2 by gpc relative to a standard plot of biphenyl, p-terphenyl, p-quaterphenyl) which is soluble in organic solvents like tetrahydrofuran (THF) and chloroform. This polymerization can occur over a wide range of temperatures (−78° to 110° C.). Moreover, the invention allows the formation of predominantly para (or 4-substituted) poly(phenylene) which is soluble. It is imperative that para compound be formed if one wants to have a highly conducting material. And, since the material is soluble, films can be cast and stretched as necessary. This is a property which could not be previously obtained.

The products of the present invention may include a relatively high level of residual halogen, e.g., 1 Br for every 3-4 phenyl rings. While this is not an unusual observation, the removal of these halogen atoms may be advantageous. We have therefore devised a method for the facile removal of these groups.

Since the poly(phenylene) prepared by our method is soluble, we were able to dissolve the material in THF, cool it to −78° C., and treat it with t-butyllithium. The lithiated polymer was then quenched with water.

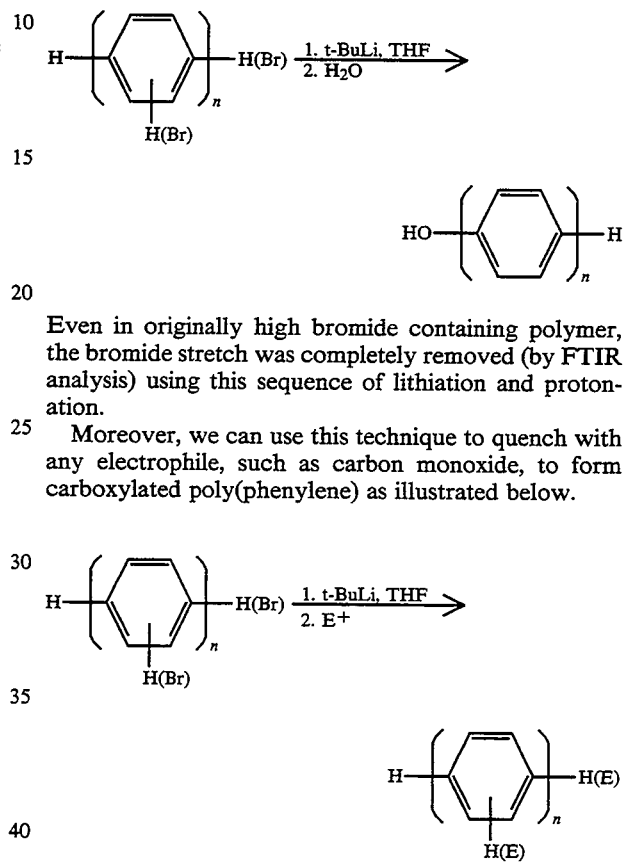

Even in originally high bromide containing polymer, the bromide stretch was completely removed (by FTIR analysis) using this sequence of lithiation and protonation.

Moreover, we can use this technique to quench with any electrophile, such as carbon monoxide, to form carboxylated poly(phenylene) as illustrated below.

E$^+$ = CO$_2$, I$_2$, Br$_2$, Cl$_2$, RCOH, RCOR',
E = CO$_2$H, I, Br, Cl, RC(OH)H, RC(OH)R', respectively.

wherein R and R', which may be the same or different, are alkyl or alkenyl, alkynyl, aryl, or a leaving group such as alkoxy or amide, Thus, the present invention provides both a method to generate soluble poly(phenylenes), and a method to functionalize the polymers with a variety of groups, via lithium halogen exchange.

The invention will now be further described by way of the following, nonlimiting examples.

EXAMPLE 1

Materials and Methods

Ether, THF, and dioxane solvents were freshly distilled over sodium/benzophenone ketyl under an atmosphere of dry nitrogen. The hexamethylphosphoramide (HMPA) was distilled over calcium hydride under an atmosphere of dry nitrogen, and stored under nitrogen in a serum stoppered flask. All reagents were purchased from Aldrich Chemical Company, Inc., and used without further purification unless otherwise noted. Gel permeation chromatography (gpc) was carried out on a Perkin Elmer 250 system for liquid chromatography using helium degassed, filtered THF as an elutant. A Perkin Elmer LC-30 refractive index detector was used. The column was a Polymer Laboratories SEC Column (polystyrene/DVB) low molecular weight column, 30×7.5 cm, 5μ, 500 Å which was maintained at 60° C. under a flow rate of 1.5 Ml/min at approximately 650 psi. All gpc data was calibrated relative to a standard plot of biphenyl, p-terphenyl, p-quaterphenyl which had a correlation for the three compounds of >0.997. A new calibration curve was recorded for each days use. All samples were run at least three times on the gpc and the average $M_w$ and $M_n$ were recorded. A calibration curve from polystyrene standards showed approximately the same $M_w$ but very low $M_n$ which were clearly inaccurate by observing the chromatograms. Using polystyrenes as a standard, a typical $M_w$ was 1800 while the $M_n$ was 300. The IR analyses recorded on a Perkin Elmer 1600 FTIR. The $^1$H NMR were recorded on a Bruker AM 300. All reactions were executed under an atmosphere of dry nitrogen with the strict exclusion of air and moisture. All glassware was oven dried at 110° C. for at least 12 h and flushed with dry nitrogen prior to cooling to room temperature.

Synthetic Procedure

To a 25 Ml two-necked round-bottomed flask containing a Teflon coated magnetic stir bar and fitted with a reflux condenser was added 1,4-dibromobenzene (0.477 g, 2.0 mmol) and dioxane (2 Ml). After cooling the solution to 0° C., t-butyllithium (2.4 Ml, 4.2 mmol, 1.75M in pentane) was slowly added. The ensuing white-yellow slurry was stirred at 0° C. for 30 min before warming rapidly to 85° C. with an oil bath. To the solution was rapidly added HMPA (0.35 Ml, 1 mmol) and the dark solution was allowed to cool to room temperature. The reaction mixture was poured into 3N hydrochloric acid (25 Ml) and the organic layer was separated. The aqueous phase was extracted with dichloromethane (3×) and the combined organic phase was washed with 3N hydrochloric acid (10×). The solution was dried over anhydrous magnesium sulphate and removal of the solvent in vacuo afforded a tan-brown solid. Ether soluble fraction=0.1132 g. Ether insoluble but THF soluble fraction=0.0296 g. Data for the high molecular weight fraction (ether insoluble, THF soluble): $^1$H NMR (300 Mhz, CDCl$_3$) δ7.0–7.8 (m). FTIR (KBr) 2925.9 (w), 1476.6 (s), 1384.5 (s), 1072.9 (m), 1001.9 (m), 809.2 (s), 760.0 (w), 699.4 (w) cm$^{-1}$. $M_w$=1671, $M_n$=875, $M_w/M_n$=1.9.

EXAMPLES 2–25

The procedure of Example 1 was repeated using varying amounts of reagents and differing reaction conditions as shown in Table I. The starting materials used in each example was 1,4 dibromobenzene, except in Examples 7 and 8 where 4,4'-dibromobiphenyl was used in place of 1,4-dibromo-benzene, Examples 21 where 1,4 dichlorobenzene was used, Examples 22 and 23 where 1,4 diiodobenzene was used and Example 24 where poly(phenylene) was used). In each case, a benzenoid polymer was formed and in each case, with the exception of Examples 7 and 8, no insoluble material was formed. Proton NMR confirmed that no aliphatic materials were formed except in the case where TMEDA was used in place of hexamethylphosphoramide.

| Ex # | Starting Material (g) | Equiv. of t-BuLi | Li-x Exch. Solv. | Temp Li-x Exch (°C.) | Temp HMPA Addn (°C.) | Equiv of HMPA | Yield of Et$_2$O Sol | Yield Et$_2$O Insol, THF Sol | Yield CH$_2$Cl$_2$ Insol | $M_w$ | $M_n$ | $M_w/M_n$ | Major IR Bands (cm$^{-1}$) |
|---|---|---|---|---|---|---|---|---|---|---|---|---|---|
| 1 | 0.472 | 2.1 | Dioxane | 0° | 85° | 1 eq | .1132 | 0.296 | | 1671 | 875 | 1.913 | 1476.6, 1384.5, 1072.9, 1011.9, 809.2, 760.0, 694.4 |
| 2 | 0.236 | 2.1 | Et$_2$O | −78° | 35° | 1 eq | .0491 | .008 | | 1727 | 848 | 2.099 | 1384.4, 759.2, 699.0 |
| 3 | 0.236 | 2.1 | THF | −78° | 65° | 1 eq | .0472 | .0227 | | 1663 | 869 | 1.937 | 2924.3, 1384.4, 1075.2, 820.1, 758.8, 698.4 |
| 4 | 0.236 | 2.1 | Et$_2$O | −78° | See Note 1 | 1 eq | .035 | .0186 | | 910 | 468 | 1.965 | 2925.4, 2854.4, 1384.4, 1068.6, 812.5, 759.1, 699.5 |
| 5 | 0.236 | 2.1 | Et$_2$O | 0° | See Note 1 | 1 eq | .021 | .01 | | 873 | 582 | 1.501 | 2926.4, 1384.3, 1067.8 |
| 6 | 0.236 | 2.1 | Et$_2$O | −78° | −78° | 1 eq | .0302 | .0316 | | 876 | 520 | 1.6905 | 2925.2, 1389,4, 1073.7, 810.7, 758.6, 698.6 |
| 7 | 0.472 | 2.1 | Et$_2$O | −78° | 0° | 1 eq | .0343 | .0109 | | 1028 | 416 | 2.4807 | 1597.9, 1476.1, 1384.5, 1003.8, 826.7, 758.9, 698.2 |
| 8 | 0.472 | 2.1 | Et$_2$O | −78° | 35° | 1 eq | .0619 | .0412 | | 1601 | 666 | 2.917 | 1474.6, 1384.5, 1004.9, 759.2, 698.8 |
| 9 | 0.472 | 2.1 | Et$_2$O | −78° | 0° | 1 eq | .0248 | .009 | | 1325 | 696 | 1.9077 | 1384.4, 758.8, 699.0 |
| 10 | 0.472 | 2.1 | THF | −78° | 66° | 1 eq | | .1133 | | 1811 | 800 | 2.316 | 3027.8, 1479.9, 1005.8, 821.4, 790.0, 758.9, 698.5 |
| 11 | 0.472 | 2.1 | THF | −78° | 66° | 3 eq | .0397 | .1121 | | 1987 | 845 | 2.353 | 1384.5, 758.2, 697.8 |
| 12 | 1.416 | 2.0 | Et$_2$O | −78° | 35° | 1 eq | .1072 | .27 | | 1739 | 581 | 3.237 | 1389.4, 758.6, 698.6 |
| 13 | 0.472 | 2.1 | Et$_2$O | −78° | −78° | 1 eq | .0253 | .0895 | | 739 | 295 | 2.51 | 1384.6, 1174.8, 1008.9, 822.0, |

-continued

| Ex # | Starting Material (g) | Equiv. of t-BuLi | Li-x Exch. Solv. | Temp Li-x Exch (°C.) | Temp HMPA Addn (°C.) | Equiv of HMPA | Yield of Et2O Sol | Yield Et2O Insol, THF Sol | Yield CH2Cl2 Insol | $M_w$ | $M_n$ | $M_w/M_n$ | Major IR Bands (cm$^{-1}$) |
|---|---|---|---|---|---|---|---|---|---|---|---|---|---|
| 14 | 0.472 | 2.1 | Di-oxane | 0° | 85° | 1 eq | | .08 | | 1117 | 689 | 1.623 | 759.6, 699.1 1476.,9, 1384.6, 1.008.3, 812.6, |
| 15 | 1.888 | 2.0 | Di-oxane | 0° | 85° | 1 eq | .181 | .1219 | | 1993 | 697 | 2.866 | 759.2, 697.7 1474.5, 1384.6, 1073.8, 1003.9, 814.0, 789.5, |
| 16 | 1.416 | 2.0 | Di-oxane | 0° | 85° | 3 eq | | .1324 | | 1817 | 790 | 2.302 | 759.4, 698.5 1479.3, 1384.6, 1003.3, 812.5, 788.9, 758.5, |
| 17 | 0.708 | 1.8 | Di-oxane | 0° | 80° | 1 eq | .1817 | .0496 | | 1817 | 793 | 2.292 | 697.9 1477.1, 1384.5, 1001.9, 809.4, 761.1, 699.3, |
| 18 | 0.472 | 2.1 | Di-oxane | 0° | 80° | 1 eq | .0323 | .0214 | | | | | 668.4 1075.1, 1384.5, 1075.0, 1004.4, 812.2, 760.9, |
| 19 | 0.624 | 2.0 | THF | −78° | 66° | 1 eq | .0584 | .11 | .1662 | 1212 | 496 | 2.444 | 699.0 1474.2, 1389.5, 1074.5, 1003.5, 816.0, 790.4, |
| 20 | 0.624 | 2.0 | Di-oxane | 0° | 89° | 1 eq | .2137 | .1071 | | 544 | 268 | 2.035 | 758.6, 696.5 1471.1, 1383.8, 1068.2, 1001.1, 809.0, 789.1, |
| 21 | Dichlorobenzene 0.4410 | 2.0 | THF | −78° | 66° | 1 eq | | .0215 | .2334 | 2450 | 857 | 2.86 | 670.8 1027.8, 2992.2, 1545.6, 1474.2, 1384.3, 1092.3, 903.4, 816.8, 786.5, 759.0, |
| 22 | Diiodobenzene 0.9894 | 2.0 | THF | −78° | 66° | 1 eq | .1564 | .1473 | .0245 | 1801 | 769 | 2.344 | 693.3 1474.0, 1384.4, 1063.9, 1001.7, 812.6, 756.8, |
| 23 | Diiodobenzene 0.9894 | 2.0 | Di-oxane | 0° | 60° | 1 eq | .2953 | .0334 | | 715 | 324 | 2.208 | 769.3, 654.2 1474.9, 1384.5, 1065.5, 999.4, 805.4, 764.1, |
| 24 | PPP 0.0329 | xs | THF | −78° | X | X | ← | .0234 | → | 1842 | 891 | 2.068 | 690.2 1474.9, 1384.5, 1116.3, 1005.0, 824.5, 792.3, |
| 25 | Dibromobenzene | 2.0 | Et2O | −78° | −78° | 1 eq | .061 | .0085 | | 1062 | 425 | 2.4957 | 758.8, 698.4 1384.4, 1076.3, 815.2, 761.5, 697.3 |

Note 1: Add at room temperature prior to adding BuLi.

We claim:

1. A method of preparing a benzenoid polymer comprising the steps of:
   (a) polymerizing a lithioarylhalide compound in the presence of a polar aprotic compound which is not decomposed by alkyllithium compounds;
   (b) separating the polymerized benzenoid polymer from any unreacted starting materials;
   (c) dissolving the separated material in a solvent;
   (d) treating the dissolved material with an excess of an alkyllithium compound that undergoes lithium/halogen exchange to replace halogen atoms attached to the polymer with lithium; and
   (e) quenching the lithiated polymer with an electrophile or water.

2. A method of preparing a benzenoid polymer comprising the steps of:
   (a) polymerizing a lithioarylhalide compound in the presence of a polar aprotic compound which is not decomposed by alkyllithium compounds wherein the polar aprotic compound is selected from the group consisting of hexamethyl phosphoramide, N,N,N',N'-tetramethylethylenediamine and hexamethylphosphorous triamide,
   (b) separating the polymerized benzenoid polymer from any unreacted starting materials;
   (c) dissolving the separated material in a solvent;
   (d) treating the dissolved material with an excess of an alkyllithium compound that undergoes lithium/halogen exchange to replace halogen atoms attached to the polymer with lithium; and
   (e) quenching the lithiated polymer with an electrophile or water.

3. A method of preparing a benzenoid polymer comprising the steps of:
   (a) preparing a paralithioarylhalide by reacting a para-substituted aryldihalide with at least one equivalent of an alkyllithium compound that undergoes lithium/halogen exchange;
   (b) polymerizing the paralithioarylhalide compound in the presence of a polar aprotic compound which is not decomposed by alkyllithium compounds;

(c) separating the polymerized benzenoid polymer from any unreacted starting materials;
(d) dissolving the separated material in a solvent;
(e) treating the dissolved material with an excess of an alkyllithium compound that undergoes lithium/halogen exchange to replace halogen atoms attached to the polymer with lithium; and
(f) quenching the lithiated polymer with an electrophile or water.

4. A method according to claim 1, wherein the lithiated polymer is quenched with an electrophile selected from the group consisting of $CO_2$, $I_2$, $Br_2$, $Cl_2$, RCOH and RCOR', wherein R and R', which may be the same or different, are alkyl, alkenyl, alkynyl, aryl, alkoxy or amide.

5. A method according to claim 3, wherein the lithiated polymer is quenched with an electrophile selected from the group consisting of $CO_2$, $I_2$, $Br_2$, $Cl_2$, RCOH and RCOR', wherein R and R', which may be the same or different, are alkyl, alkenyl, alkynyl, aryl, alkoxy or amide.

6. A method according to claim 1, wherein the lithiated polymer is quenched with water whereby a halogen-free polymer is formed.

7. A method according to claim 3, wherein the lithiated polymer is quenched with water whereby a halogen-free polymer is formed.

8. A method for dehalogenation of soluble poly(phenylene) comprising the steps of
(a) dissolving the poly(phenylene) in a solvent;
(b) reacting the dissolved material with an excess of an alkyllithium that undergoes lithium/halogen exchange to replace halogen atoms attached to the poly(phenylene) with lithium; and
(c) quenching the lithiated poly(phenylene) with water to form a halogen-free poly(phenylene).

* * * * *

UNITED STATES PATENT AND TRADEMARK OFFICE
CERTIFICATE OF CORRECTION

PATENT NO. : 5,338,823

DATED : August 16, 1994

INVENTOR(S) : James M. Tour et al.

It is certified that error appears in the above-indentified patent and that said Letters Patent is hereby corrected as shown below:

Column 4, lines 16-18, in the equation, "HO" should read --H--;

Columns 5 and 6, in the table, second line under heading, "Major IR Bands $(cm^{-1})$" of Ex. 1, "1011.9" should read --1001.9--;

Columns 5 and 6, in the table, second line under heading "Major IR Bands $(cm^{-1})$" of Ex. 13, "1008.9" should read --1008.0--;

Columns 7 and 8 in the table, first line under heading "Major IR Bands $(cm^{-1})$" of Ex. 14, "1476.,9" should read --1476.9--;

Columns 7 and 8 in the table, second line under heading "Major IR Bands $(cm^{-1})$" of Ex. 14, "1.008.3" should read --1008.3--.

Signed and Sealed this

Fourteenth Day of March, 1995

Attest:

BRUCE LEHMAN

*Attesting Officer*     *Commissioner of Patents and Trademarks*